United States Patent [19]
Ratzel et al.

[11] Patent Number: 4,547,718
[45] Date of Patent: Oct. 15, 1985

[54] VEHICLE SEAT POSITIONING SYSTEM WITH ENTRY-FACILITATING FEATURE

[75] Inventors: Rüdiger Ratzel, Bühl; Erich Schneider, Kirchheim, both of Fed. Rep. of Germany

[73] Assignee: Robert Bosch GmbH, Stuttgart, Fed. Rep. of Germany

[21] Appl. No.: 415,432

[22] Filed: Sep. 7, 1982

[30] Foreign Application Priority Data

Sep. 18, 1981 [DE] Fed. Rep. of Germany ....... 3137151

[51] Int. Cl.⁴ .............................................. G05B 19/42
[52] U.S. Cl. .................................... 318/568; 318/603; 318/103
[58] Field of Search ....................... 318/568, 603, 103; 297/330, 341

[56] References Cited

U.S. PATENT DOCUMENTS

4,101,169  7/1978  Muraishi et al. ................ 297/341
4,264,849  2/1981  Fleischer et al. ................ 318/568

Primary Examiner—William M. Shoop
Assistant Examiner—Saul M. Bergmann
Attorney, Agent, or Firm—Frishauf, Holtz, Goodman & Woodward

[57] ABSTRACT

When the back of the movable front seat of a motor vehicle is folded down, and at the same time a door is opened for entering into the rear seat portion of the passenger compartment, the front seat is caused by a positioning system to move to a forward position. When the door in question is closed or when the front seat back is restored to normal position, whichever occurs first, the seat is caused to return to its original position. This convenience for entrance into or exit from the rear seat is combined into a positioning system for the front seat, which can also serve for other automatic adjustments.

5 Claims, 1 Drawing Figure

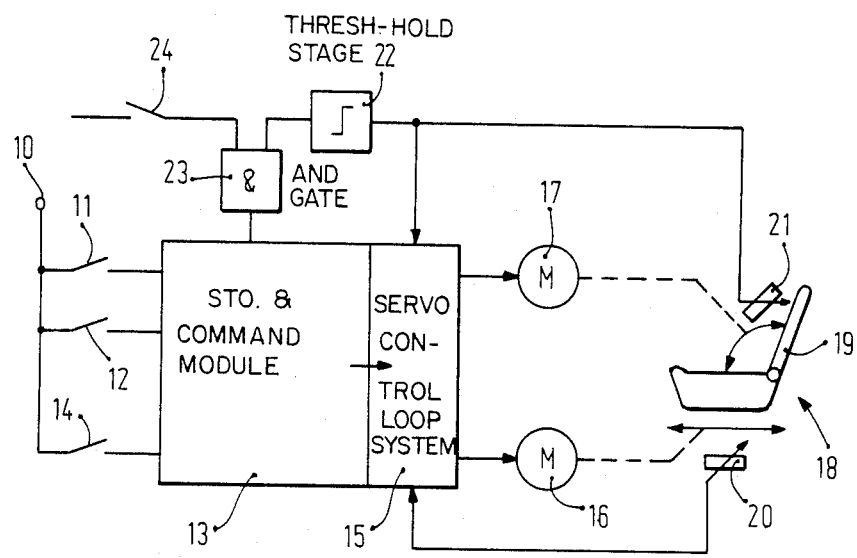

VEHICLE SEAT POSITIONING SYSTEM WITH ENTRY-FACILITATING FEATURE

This invention concerns a system for changing the position of a front seat of a vehicle under control of one or more positioning motors for causing the front seat to be moved to one of a number of desired positions.

Systems for displacing vehicle seats from one position to another in response to stored designations of various desired positions are known from published German patent applications DE-OS No. 27 34 264 and DE-OS No. 28 18 806, as well as in the correponding U.S. Pat. No. 4,264,849.

These systems cause the seat to be displayed by the operation of various electrical positioning motors. A desired position signal is furnished to a servo control loop to which actual position signals are also supplied for the generation of an error signal by which the corresponding positioning motor is caused to operate to bring the vehicle seat into the desired position, and when the input signals of the servo control loop balance, the positioning motor is shut down. In order to facilitate the entry of the driver into the vehicle, the door contact by which he enters into the driver seat, is utilized as a positioning command switch which causes the seat to be shifted rearwardly. Especially in vehicles having two or three doors, this operation prevents the entry of persons desiring to sit on the rear seats. Even without the shifting arrangement just described for the convenience of the driver getting into his seat, getting into the rear seats of the vehicle is always a tiresome procedure.

THE INVENTION

It is an object of the present invention to improve systems for positioning the front seat of a vehicle so that the entry into the rear sitting space of a vehicle and exit therefrom is facilitated, without impairing the known provisions for the convenience of the vehicle driver.

Briefly, advantage is taken of the common feature that a person desiring to get into the rear set or to get out of it can cause the back of the seat in front of the one which he wishes to occupy to tilt forward when that seat is unoccupied. Means are provided for producing a signal when the seat back is thus tilted forward, and another signal when some other condition indicating a desire for entry or exit is present, for example a signal produced by a door being moved substantially out of its closed position. The vehicle displacement system is then caused to move the front seat in question forward when both of the signals are present at the same time, thus clearing the way for the person who wishes to get into or out of a rear seat.

In the simplest case, the front seat can be equipped simply with a motor for shifting the front seat back for the convenience of the driver getting in or out, and forward out of the normal position for the convenience of a person in the rear seat. Then, according to the invention, a simple coincidence circuit can be used to operate the motor to propel the seat forward until a limit switch stops the movement. In a more elaborate system, which permits the position of the vehicle seat to be adjusted for personally fitting one or more persons who usually drive the vehicle, so that a number of desired position signals are stored and then called out of memory when the seat is to be moved to one of them, the above-described operations in accordance with the invention can be made part of the functions of a microcomputer by which the front seat can be made to assume any of a number of desired positions for various purposes.

THE DRAWING

The invention is further described by way of illustrative example with reference to the annexed drawing, in which the single FIGURE thereof is a block circuit diagram of an embodiment of the invention.

DESCRIPTION OF THE ILLUSTRATED EMBODIMENT

The terminal 10 is connected in a manner not shown in the drawing to the positive pole of the supply voltage which in the usual case is the starter battery of the vehicle. The positioning switch elements 11 and 12 are switches for entering or calling out in and from addresses in the memory of a storage and command module 13 data in the form of electrical signals representing desired positions and/or attitudes of the vehicle seat. The switch 14 is a switch that is operated when entering data into the storage and command module 13. The storage and command module 13, which may be a part of a micro-computer, supplies desired position values and displacement commands to a servo control loop system 15, which may also be part of the same microcomputer. The servo control loop system 15 has outputs for operating displacement devices 16 and 17 that are constituted as positioning motors, the device 16 serving for lengthwise displacement of a vehicle seat 18 and the device 17 for changing the inclination of the seat back 19. The actual position signals are provided by two potentiometers 20 and 21 and furnish to the remainder of the servo loop system 15. The equipment described up to now is known from the above-cited prior art references that are hereby incorporated by reference for further details of this part of the equipment. Both the storage and command module 13, as well as the servo control loop 15, can of course be made either as a micro-computer, as illustrated above, or as a collection of circuits linking discrete components. The acquisition signal for the seat back inclination is, furthermore, according to the invention, supplied to a threshold stage 22 which provides its output to one input of an AND-gate 23, which has its second input connected with a door contact 24. The output of the AND-gate 23 is connected to the storage and command module 13 and serves as a further positioning switch member. The storage of desired position data in the storage and command module 13 is performed in accordance with the known practices in the art by operation of the storage command switch 14, followed by operation of one of the positioning switches 11 or 12, each of which stores information at a particular address in the storage portion of the unit 13. If, thereafter, one of the stored desired positions is to be taken by the movable vehicle seat, it is enough to actuate the corresponding one of the switches 11 and 12, since that then provides the stored position signal values to the servo control loop system 15. In consequence, the appropriate displacement mechanism or mechanisms 16,17 is or are then set into motion in order to modify the actual position in the directions of the desired positions. A position once reached is maintained after the positioning motors are shut down, until either another of the positioning switch memers is actuated, or else the positioning mechanisms 16 and/or 17 are directly controlled to move the seat into another position and/or attitude by means not shown in the drawing.

If, now, a door is open, a 1-signal is applied to the first input of the AND-gate 23 by the corresponding door contact 24. If then the seat back 19 is folded down, the actual position signal produced by the potentiometer 21 is then modified in such a way that the threshold stage 22 responds, and a 1-signal is applied to the second input of the AND-gate 23. In consequence, from the output of this AND-gate 23, a positioning command is given just as if one of the positioning switch members 11 or 12 had been actuated, and a corresponding desired position signal is supplied to the servo loop system 15. The vehicle seat 18 is then shifted forward, so that the rear seats of the vehicle can be conveniently reached. If one of the conditions is removed, especially if the seat back 19 is folded back into normal seating position again, the output signal of the AND-gate 23 changes and there is a switchover to the previously existing desired position value. At the same time this signal change produces a new displacement command, and the seat moves back into its original position.

If no positioning mechanism is provided in the particular vehicle for the seat back 19, or if the actual position signal transducer is coupled to the positioning mechanism, it is possible in the simplest case for the seat back position to control a signal for the purposes of the invention by a limit switch, which operates when the seat is fully folded down. The threshold stage 22 in that case can be dispensed with. Of course, instead of the door contact 24, it is also possible to utilize some other entry system, for example, the provision of a pushbutton for the operation of some other contact related to an initial stage of entry.

Instead of the storage of the forward position to be reached by the vehicle seat to accommodate an entering passenger or a leaving passenger in the rear seat, the output signal of the AND-gate 23, as already mentioned, in a simple version of the invention, can simply be a command for the operation of the displacement mechanism 16 in the forward direction. This operation will continue until a limit switch is actuated by the seat as it reaches the forward position. The trailing edge of the output signal of the AND-gate 23 will then again provide a positioning command for return to the original position, operating in the same way until termination by another limit switch. Such a system can also be combined with a similarly simplified system for moving the front seat to the rear when the driver wants to enter the front seat, particularly where the vehicle has four doors, since it is desirable to have two different contacts in such a case.

Although the invention has been described with respect to a particular illustrated example, it will thus be recognized that variations and modifications are possible within the inventive concept.

We claim:

1. Vehicle seat-positioning system having means for producing on demand a set of positions representative electrical signals for at least one predetermined desired vehicle seat position, means for producing a set of electrical signals representative of actual vehicle seat position, means for producing error signals in response to said desired and actual vehicle position signals, means for operating a plurality of electrically driven positioning mechanisms in response to said error signals to bring a vehicle seat into a predetermined desired position, and the improvement, for facilitating entry into and exit from said vehicle, comprising in combination:

means for folding forward the back of at least one front set out of the range of normal seating attitudes of said seat back, independently of said positioning mechanisms, actuatable either from inside the vehicle behind said front seat or from outside the vehicle through a door thereof;

means for producing a first electrical signal when a front seat of said vehicle has its back folded forwards, out of said normal attitude range;

means for producing a second electrical signal in response to a condition indicative of a desire to enter or leave the vehicle other than the folding forward of the back of said front seat;

and means for causing one of said positioning mechanisms to move said seat to a forward position when said first signal and said second signal are simultaneously present.

2. A system as defined in claim 1, in which said means for producing position representative electrical signals is constituted by the memory and memory access portion of a micro-computer.

3. A system as defined in claim 1, in which said means for producing said second electrical signal is constituted, at least in part, by a switch operated by a door in the neighborhood of said vehicle seat, connected so as to produce said second electrical signal when said door is moved substantially out of its closed position.

4. A system as defined in claim 1, in which said means for producing said first electrical signal is constituted at least in part by a switch operable by the back of said vehicle seat when it is moved out of a normal seating position.

5. A system as defined in claim 1, in which one of said positioning mechanisms is provided for operating the control of the inclination of the back of said vehicle seat and said means for producing a set of signals representative of actual vehicle seat positions includes means for producing an electrical signal representative of the actual position of said vehicle seat back, and said means for producing said first electrical signal is constituted by a threshold stage to which said signal representative of actual seat back position is provided as an input, for producing an output when said signal representative of actual seat back position is outside of a range corresponding to normal sitting position.

* * * * *